(12) United States Patent
Lin et al.

(10) Patent No.: US 11,899,170 B2
(45) Date of Patent: Feb. 13, 2024

(54) OPTICAL LENS AND PROJECTION APPARATUS

(71) Applicant: Young Optics Inc., Hsinchu Science Park (TW)

(72) Inventors: Yu-Chen Lin, Hsinchu Science Park (TW); Chun-Tung Wu, Hsinchu Science Park (TW)

(73) Assignee: YOUNG OPTICS INC., Hsinchuscience Park (TW)

( * ) Notice: Subject to any disclaimer, the term of this patent is extended or adjusted under 35 U.S.C. 154(b) by 409 days.

(21) Appl. No.: 16/918,265

(22) Filed: Jul. 1, 2020

(65) Prior Publication Data
US 2021/0003823 A1    Jan. 7, 2021

(30) Foreign Application Priority Data
Jul. 1, 2019 (TW) ................. 108123040

(51) Int. Cl.
| | |
|---|---|
| *G02B 13/00* | (2006.01) |
| *G02B 9/34* | (2006.01) |
| *G02B 1/04* | (2006.01) |
| *G03B 21/20* | (2006.01) |
| *G02B 27/42* | (2006.01) |

(52) U.S. Cl.
CPC ........... *G02B 13/004* (2013.01); *G02B 1/041* (2013.01); *G02B 9/34* (2013.01); *G02B 13/0055* (2013.01); *G02B 27/4205* (2013.01); *G03B 21/2006* (2013.01)

(58) Field of Classification Search
CPC .... G02B 13/004; G02B 9/34; G02B 13/0055; G03B 21/2006
See application file for complete search history.

(56) References Cited

U.S. PATENT DOCUMENTS

| | | | |
|---|---|---|---|
| 6,731,434 B1 * | 5/2004 | Hua | ................... G02B 27/0172 359/686 |
| 6,804,066 B1 | 10/2004 | Ha et al. | |
| 7,944,627 B2 | 5/2011 | Sakagami | |
| 8,194,333 B2 * | 6/2012 | Iba | ........................... G02B 9/34 359/741 |
| 2007/0177275 A1 * | 8/2007 | McGuire, Jr. | .......... G02B 17/08 359/630 |

* cited by examiner

*Primary Examiner* — Wen Huang
(74) *Attorney, Agent, or Firm* — Muncy, Geissler, Olds & Lowe, P.C.

(57) ABSTRACT

An optical lens includes a first lens with a positive refractive power, a second lens having a diffractive optical surface and a negative refractive power, and a third lens with a positive refractive power arranged in order from a magnified side to a minified side. A total number of lenses with refractive powers in the optical lens is smaller than six, and the first lens, the second lens and the third lens are made of plastic.

16 Claims, 13 Drawing Sheets

OPTICAL LENS AND PROJECTION APPARATUS

BACKGROUND OF THE INVENTION a. Field of the Invention

The invention relates an optical lens and a projection apparatus having a diffractive optical element.

b. Description of the Related Art

Nowadays, there is a growing need for an optical lens to become thinner and have high optical performance due to the space and cost constraints on the current design of a projection apparatus. To meet these requirements, a projection lens needs to have low fabrication costs, large aperture, wide viewing angles and light weight. Therefore, it is desirable to provide a projection lens that may achieve lighter weight, lower fabrication costs, better imaging quality and a reduced number of lenses.

BRIEF SUMMARY OF THE INVENTION

According to one aspect of the present disclosure, an optical lens includes a first lens with a positive refractive power, a second lens having a diffractive optical surface and a negative refractive power, and a third lens with a positive refractive power arranged in order from a magnified side to a minified side. A total number of lenses with refractive powers in the optical lens is smaller than six, and the first lens, the second lens and the third lens are made of plastic. The optical lens according to the above aspect may achieve lighter weight, lower fabrication costs, good imaging quality and a reduced number of lenses.

According to another aspect of the present disclosure, a projection apparatus includes a light source, a light valve and an optical lens. The light valve is disposed downstream from and in a light path of the light source, and the optical lens is disposed downstream from and in a light path of the light valve. The optical lens includes a first lens with a positive refractive power, a second lens having a diffractive optical surface and a negative refractive power, and a third lens with a positive refractive power arranged in order from a magnified side to a minified side. A total number of lenses with refractive powers in the optical lens is smaller than six, and the first lens, the second lens and the third lens are made of plastic. The projection apparatus according to the above aspect may achieve lighter weight, lower fabrication costs, and good image projection quality.

A projection apparatus includes a light source, a light valve and an optical lens. The light valve is disposed downstream from and in a light path of the light source, and the optical lens is disposed downstream from and in a light path of the light valve. The optical lens includes a first lens, a second lens, and a third lens arranged in order in a direction. The second lens has at least one diffractive optical surface and is made of plastic. A total number of lenses with refractive powers in the optical lens is smaller than six. The projection apparatus according to the above aspect may achieve lighter weight, lower fabrication costs, and good image projection quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 6 is a through focus MTF chart, FIG. 7 illustrates an astigmatic field curve and a percentage distortion curve, and FIG. 8 illustrates a lateral color graph.

FIG. 10 is a through focus MTF chart, FIG. 11 illustrates an astigmatic field curve and a percentage distortion curve, and FIG. 12 illustrates a lateral color graph.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a zoom lens may be applied to any system or environment according to actual demands.

Figure 1:
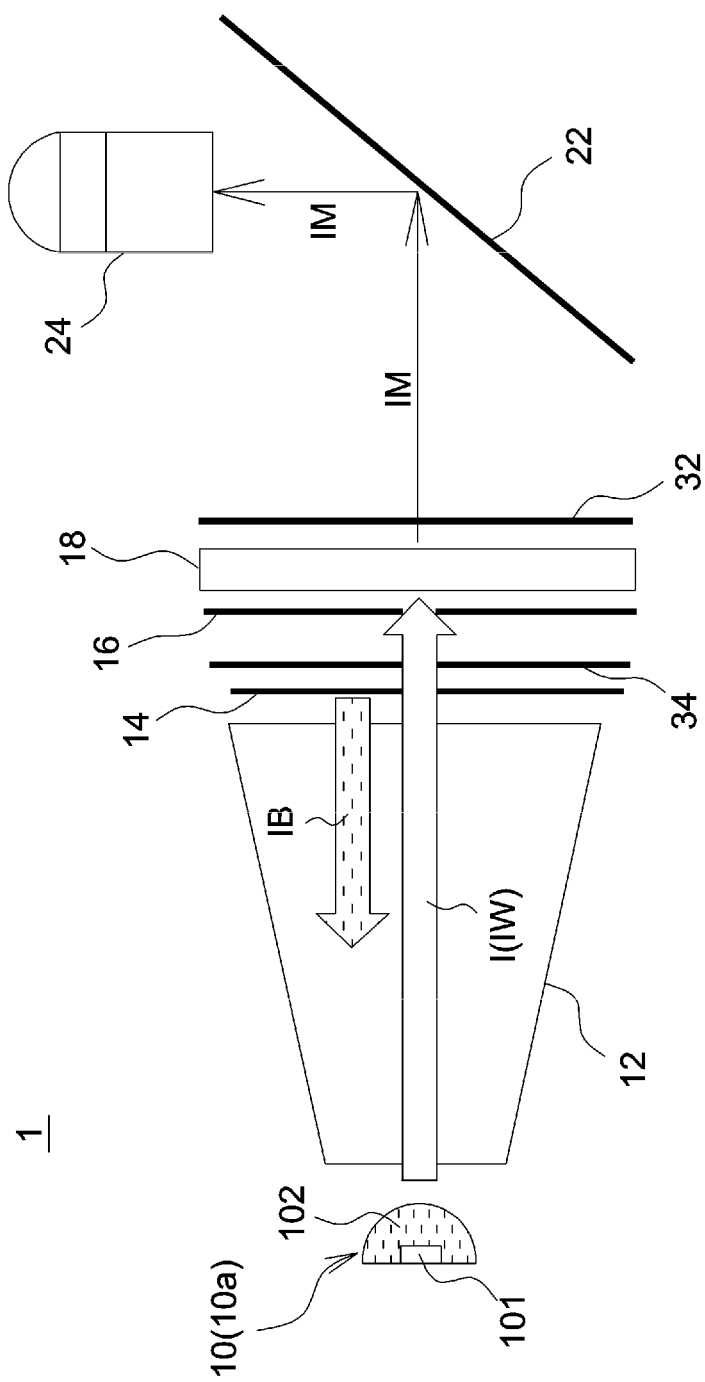
FIG. 1 shows a schematic diagram illustrating an arrangement of a projection lens in a projection apparatus according to an embodiment of the invention.

FIG. 1 shows a schematic diagram illustrating an arrangement of a projection lens in a projection apparatus according to an embodiment of the invention. Referring to FIG. 1, a light source 10 of a projection apparatus 1 emits a light beam I, and a light homogenizer 12, a transflective element 14, a polarizer 16, an LCD panel (light valve) 18, a folding mirror 22 and a projection lens 24 are arranged in order along a light path of the light beam I. The light source 10 and the light homogenizer 12 are two separate elements that are spaced apart from each other, and the light homogenizer 12 may be, for example, an integration rod, a fly-eye lens array, or a light diffuser. The light source 10 may be any device or element capable of providing illumination light, such as a conventional thermoelectric light source, a fluorescent lamp, an LED, or a laser diode. Further, a Fresnel lens 34 may be additionally provided in the light path between the transflective element 14 and the LCD panel (light valve) 18.

In this embodiment, the light source 10 is a white LED module 10a in the form of a chip package having an LED chip 101 and a phosphor layer 102. The phosphor layer 102 is disposed downstream from and in a light path of the LED chip 101, and the transflective element 14 is disposed downstream from and in a light path of the phosphor layer 102. The transflective element 14 may partially reflect and partially transmit a specific wavelength band of light. For example, the transflective element 14 may reflect a part of an incoming blue light beam and transmit the remainder of the blue light beam. Therefore, the transflective element 14 may form a light reflection path and a light transmission path, and the LCD panel 18 is disposed downstream from the transflective element 14 in a light transmission path of the transflective element 14. As shown in FIG. 1, when white light IW emitted from the white LED module 10a is homogenized by the light homogenizer 12 and incident to the transflective element 14, a part of blue light IB included in the white light IW is reflected by the transflective element 14 and returns to the phosphor layer 102 to re-excite fluorescent materials in the phosphor layer 102 and thus enhance the brightness of the white LED module 10a. The enhanced white light IW passes through the polarizer 16 and the LCD panel 18 to be converted into an image beam IM. The image beam IM is then deflected by the folding mirror 22 to be guided into the projection lens 24. Further, a Fresnel lens 32 and/or Fresnel lens 34 may be used to condense and collimate a light beam I or the image beam IM. In other embodiment, other optics capable of condensing and collimating incoming light beams may replace the Fresnel lens 32 and/or Fresnel lens 34.

In this embodiment, the transflective element 14 may be a see-through mirror, or a blue-light beam splitter that reflects incoming blue light only in part. Because the transflective element 14 may partially reflect and partially transmit a specific wavelength band of light, the part of light reflected back to the light source may re-excite fluorescent materials in the light source to enhance the brightness of the light source. Moreover, the color temperature of the light source can be adjusted by varying transmittance/reflectance of the transflective element 14 to enhance color uniformity of projection images.

Figure 2:
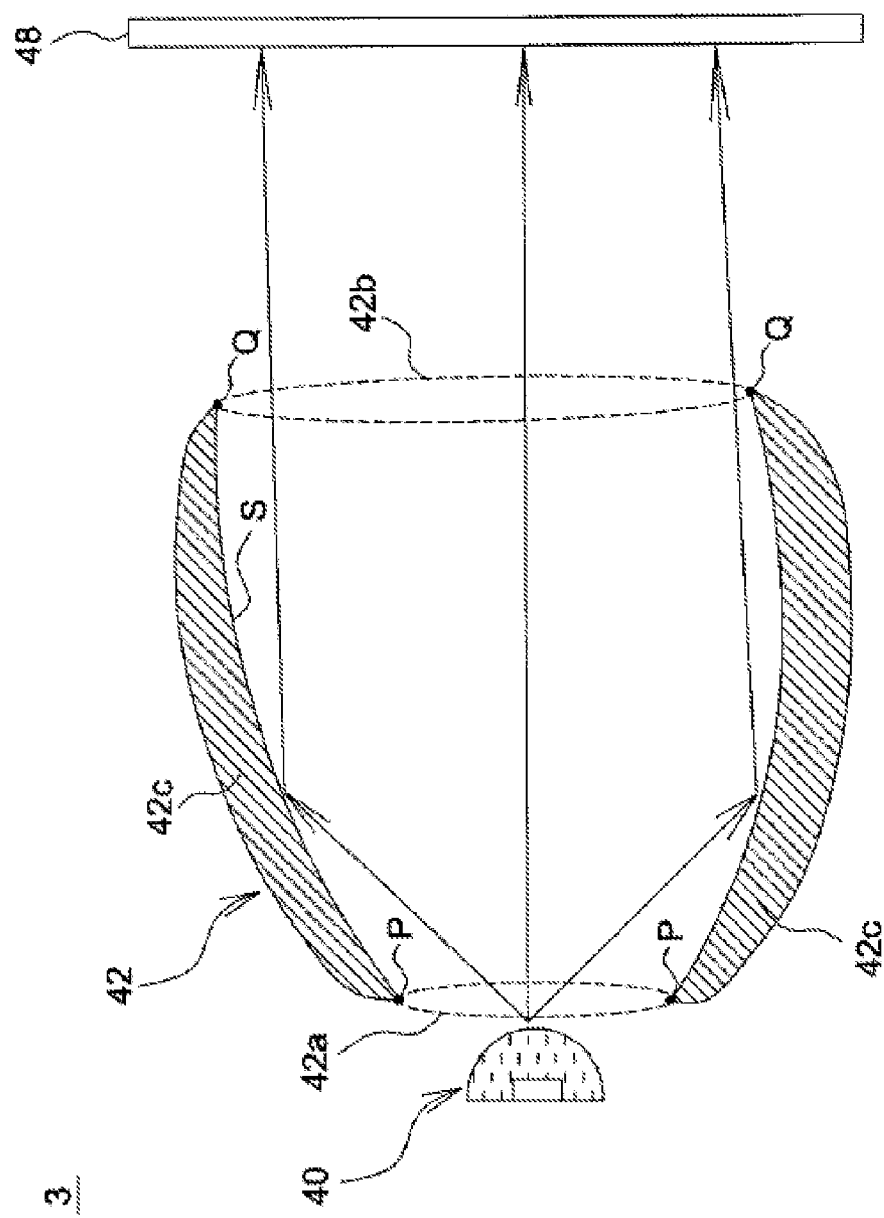
FIG. 2 shows a schematic diagram of a light homogenizer in a projection apparatus according to an embodiment of the invention.
Figure 3:
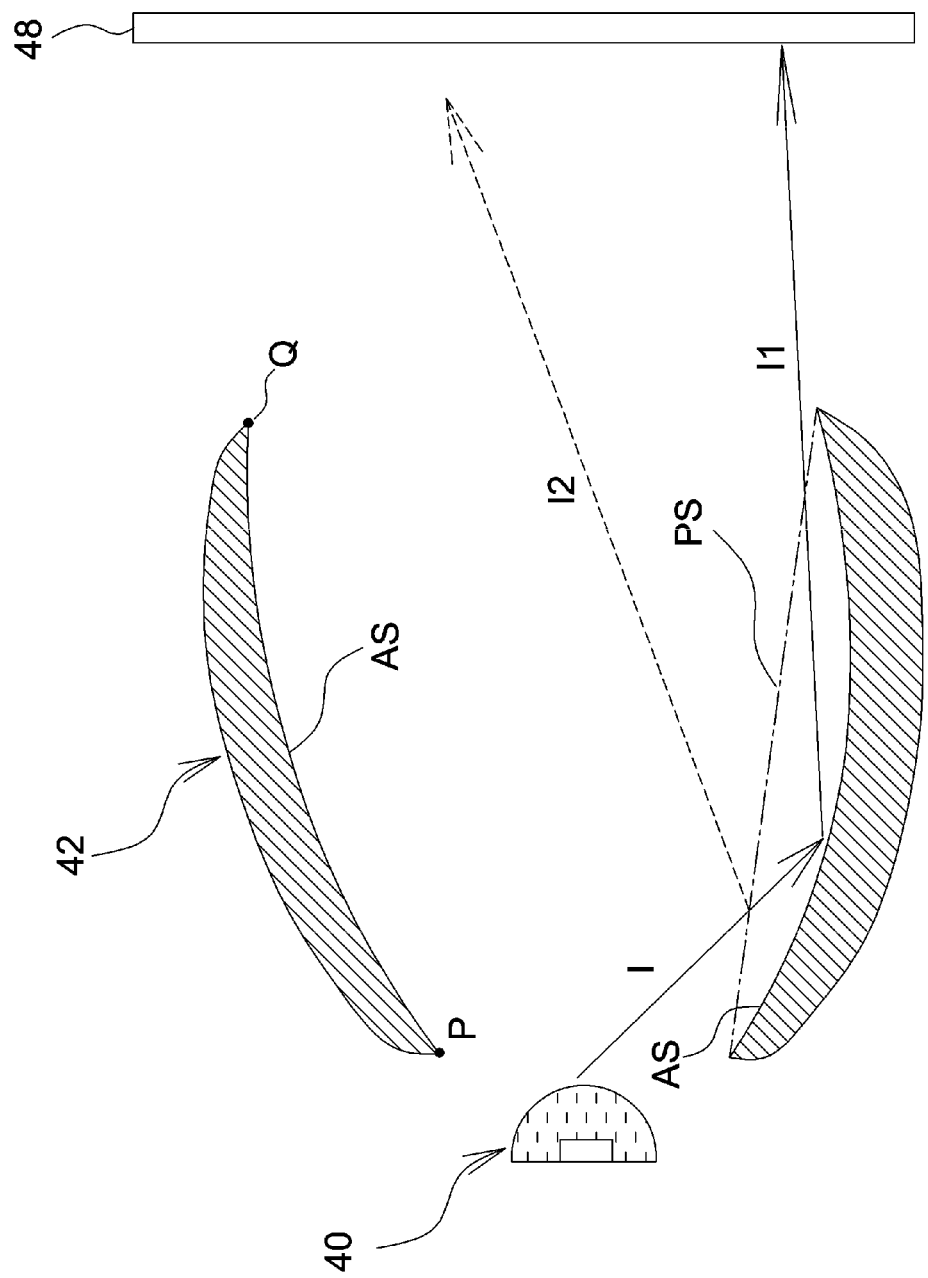
FIG. 3 shows a schematic diagram of a light homogenizer in a projection apparatus according to another embodiment of the invention.

FIG. 2 shows a schematic diagram of a light homogenizer in a projection apparatus according to an embodiment of the invention. In this embodiment, the light homogenizer of the projection apparatus 3 is an integration rod 42 having an arc-shaped reflective surface. As shown in FIG. 2, the light source 40 and the integration rod 42 are two separate elements that are spaced apart from each other and disposed downstream from and in a light path of the light source 40. An LCD panel 48 is disposed downstream from and in a light path of the integration rod 42. Two end surfaces of the integration rod 42 are a light incident surface 42a and a light exit surface 42b. A cross section 42c of the integration rod 42 crosses a periphery of the light incident surface 42a to form a first intersection P, the cross section 42c of the integration rod 42 crosses a periphery of the light exit surface 42b to form a second intersection Q, and at least a part of a trace tracing along a reflective surface of the integration rod 42 between the first intersection P and the second intersection Q is an arc line S. FIG. 3 shows the contrast between an arc-shaped reflective surface AS of the integration rod 42 and a planar reflective surface PS of an integration rod 12a. As shown in FIG. 3, for example, a light beam I can be reflected by the arc-shaped reflective surface AS to form a light beam I1 guided towards the LCD panel 48, and the same light beam I can be reflected by the planar reflective surface PS to form a light beam I2 guided towards the LCD panel 48. By comparing the traveling directions of the light beam I1 and light beam I2, it can be seen the arc-shaped reflective surface AS is allowed to direct light away from the center of the LCD panel 48 to a greater extent to resolve the problem of overly bright center regions/overly dark corner regions in a displayed screen, therefore enhancing luminous uniformity of the displayed screen.

Figure 4:
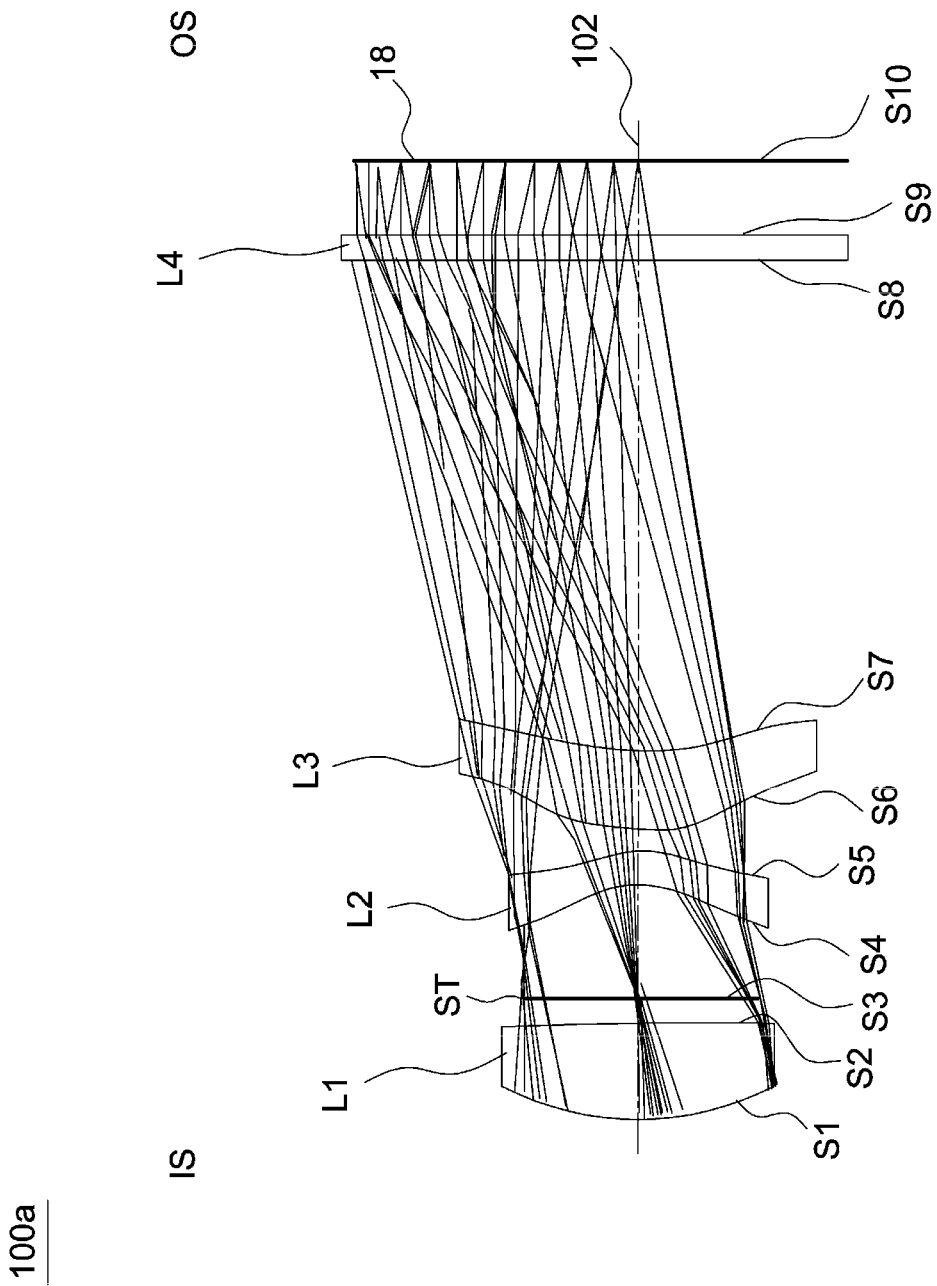
FIG. 4 shows a schematic diagram of an optical lens according to an embodiment of the invention.

FIG. 4 shows a schematic diagram of an optical lens according to an embodiment of the invention. As shown in FIG. 4, an optical lens 100a is disposed between a magnified side IS (such as an image side on the left of FIG. 4) and a minified side (such as an object side on the right of FIG. 4). In this embodiment, the optical lens 100a includes, in order from the magnified side to the minified side, a first lens L1 with a positive refractive power, an aperture stop ST, a second lens L2 with a negative refractive power, a third lens L3 with a positive refractive power, and a Fresnel lens L4 with a refractive power. Further, the minified side is disposed with an LCD panel (light valve) 18. In this embodiment, the first lens L1, the second lens L2 and the third lens L3 are plastic aspheric lens formed by injection molding. The first lens L1 and the third lens L3 are made of PMMA, and the second lens L2 is made of EP5000 plastic. In one embodiment, aspheric lenses may be formed by glass molding, but the invention is not limited thereto. A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis to correct abbreviations. Detailed optical data, design parameters and aspheric coefficients of the optical lens 100a are shown in Table 1 and Table 2 below. Note the data provided below are not used for limiting the invention, and those skilled in the art may suitably modify parameters or settings of the following embodiment with reference of the invention without departing from the scope or spirit of the invention. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + \ldots,$$

where Z denotes a sag of an aspheric surface along the optical axis 102, c denotes a reciprocal of a radius of an osculating sphere, K denotes a Conic constant, r denotes a height of the aspheric surface measured in a direction perpendicular to the optical axis 102, and parameters A-G shown in Table 2 are $4^{th}$, $6^{th}$, $8^{th}$, $10^{th}$, $12^{th}$, $14^{th}$ and $16^{th}$ order aspheric coefficients.

TABLE 1

| Surface | Radius (mm) | Interval (mm) | Refractive index | Abbe number | Object description |
|---|---|---|---|---|---|
| S1 | 59.5 | 16.81 | 1.49 | 57.44 | L1(aspheric lens) |
| S2 | 354.09 | 3.74 | | | |
| S3 | ∞ | 20.27 | | | ST(aperture stop) |
| S4 | −19.54 | 5.96 | 1.64 | 23.97 | L2(aspheric lens) |
| S5 | −34.73 | 3.7 | | | |
| S6 | 27.41 | 15.01 | 1.49 | 57.44 | L3(aspheric lens) |
| S7 | 68.11 | 87.54 | | | |
| S8 | ∞ | 5.0 | 1.49 | 57.44 | L4(Fresnel lens) |
| S9 | −56.04 | 12.57 | | | |
| S10 | | | | | light valve |

In the above Table 1, an interval of the surface S1 is a distance between the surface S1 and the surface S2 along the optical axis 102, an interval of the surface S2 is a distance between the surface S2 and the surface S3 along the optical axis 102, an interval of the surface S9 is a distance between the surface S9 of the Fresnel lens and the surface S10 of the light valve along the optical axis 102.

TABLE 2

|   | S1 | S2 | S4 | S5 | S6 | S7 | S9 |
|---|---|---|---|---|---|---|---|
| K | −4.27 | 0 | −4.54 | −6.08 | −6.25 | −21.3 | −1 |
| A | 1.01E−06 | −2.8E−06 | −3.5E−06 | 2.57E−06 | 4.03E−06 | 4.22E−06 | 6.47E−07 |
| B | −1.4E−09 | −2.4E−09 | 1.6E−08 | −2.9E−09 | −6.3E−09 | −6.4E−09 | −2.1E−10 |
| C | −3.7E−12 | 7.12E−13 | −2.3E−11 | 1.80E−11 | 4.56E−12 | 4.15E−12 | 3.07E−14 |
| D | 7.8E−15 | −5.0E−15 | 3.29E−14 | −2.3E−14 | −7.7E−16 | −1.1E−15 | −1.5E−19 |
| E | −1.5E−17 | 1.12E−17 | −3.1E−17 | 1.54E−17 | −2.0E−18 | −5.6E−19 | 0 |
| F | 1.3E−20 | 0 | 1.4E−20 | 0 | −1.7E−21 | 4.3E−22 | 0 |
| G | −5.0E−24 | 2.88E−24 | 0 | 0 | −4.3E−25 | −7.5E−26 | 0 |

Figure 5:
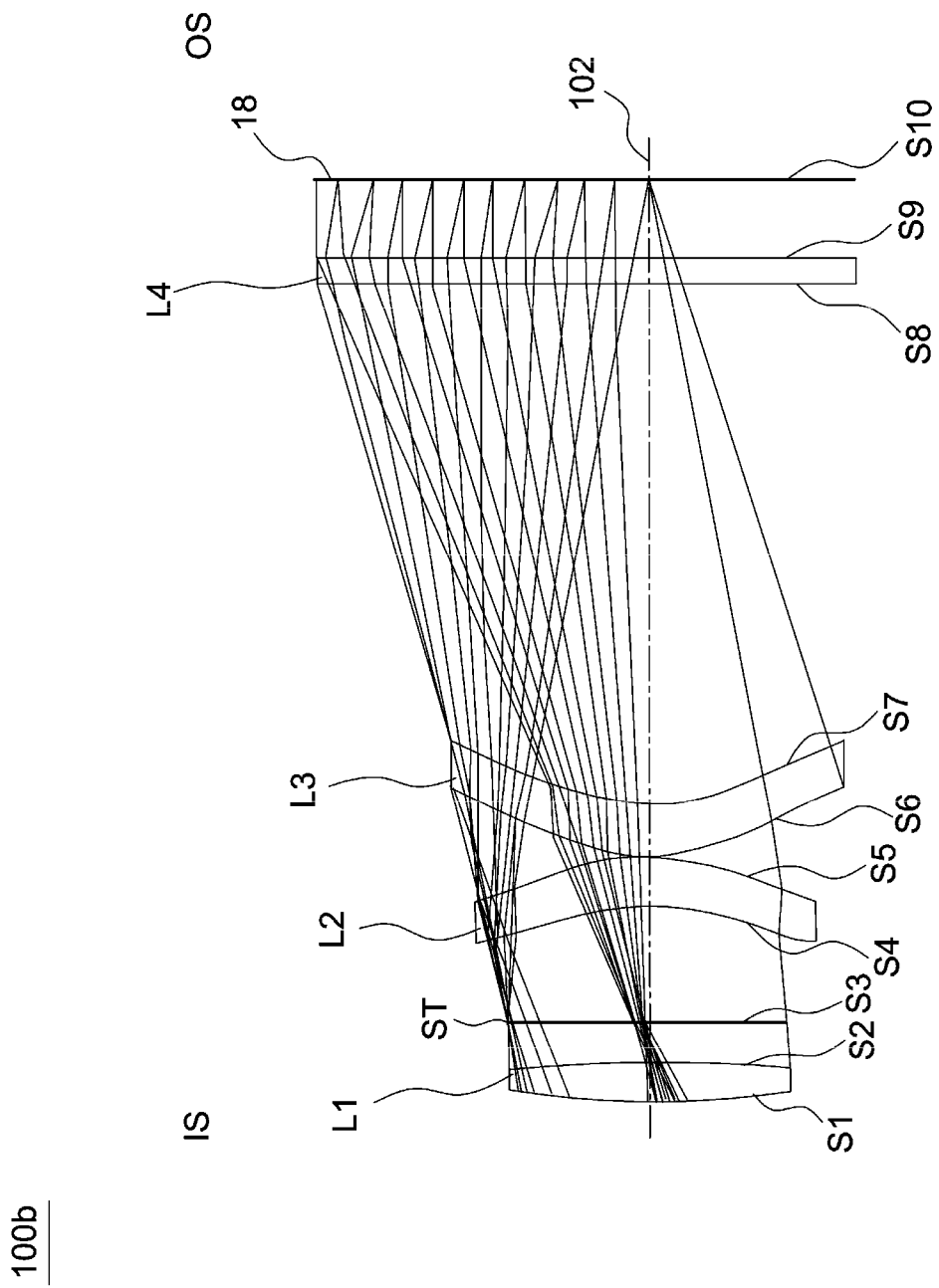
FIG. 5 shows a schematic diagram of an optical lens according to another embodiment of the invention.

FIG. 5 shows a schematic diagram of an optical lens according to another embodiment of the invention. As shown in FIG. 5, an optical lens 100b is disposed between a magnified side IS (such as an image side on the left of FIG. 5) and a minified side (such as an object side on the right of FIG. 5). In this embodiment, the optical lens 100a includes, in order from the magnified side to the minified side, a first lens L1 with a positive refractive power, an aperture stop ST, a second lens L2 with a negative refractive power, a third lens L3 with a positive refractive power, and a Fresnel lens L4 with a refractive power. Further, the minified side is disposed with an LCD panel (light valve) 18. In this embodiment, the first lens L1, the second lens L2 and the third lens L3 are plastic aspheric lens formed by injection molding. The first lens L1 and the third lens L3 are made of PMMA, and the second lens L2 is made of E48R plastic. In one embodiment, aspheric lenses may be formed by glass molding, but the invention is not limited thereto.

In the following design examples of the invention, a diffractive optical surface polynomial may be expressed as the following:

$$\Phi(r) = (2\pi/\lambda_0)\Sigma C_n r^{2n},$$

where $\Phi(r)$ denotes a phase function of a diffractive optical element, r denotes a radial distance relative to the optical axis of the optical lens, and $\lambda_0$ denotes a reference wavelength. That is, a diffractive optical surface is a lens surface superposed with a diffractive phase function.

TABLE 3

| Surface | Radius (mm) | Interval (mm) | Refractive index | Abbe number | Object description |
|---|---|---|---|---|---|
| S1 | 77.99 | 6.55 | 1.49 | 57.44 | L1(aspheric lens) |
| S2 | 178.6 | 7.52 | | | |
| S3 | ∞ | 20.58 | | | ST(aperture stop) |
| S4 | −29.8 | 8.45 | 1.53 | 55.75 | L2(aspheric lens) |
| S5 | −33.9 | 0.20 | | | |
| S6 | 25.02 | 9.40 | 1.49 | 57.44 | L3(aspheric lens) |
| S7 | 28.49 | 91.78 | | | |
| S8 | ∞ | 5.0 | 1.49 | 57.44 | L4(Fresnel lens) |
| S9 | −56.0 | 13.36 | | | |
| S10 | | | | | light valve |

An interval of the surface S1 is a distance between the surface S1 and the surface S2 along the optical axis 102, an interval of the surface S2 is a distance between the surface S2 and the surface S3 along the optical axis 102, an interval of the surface S9 is a distance between the surface S9 of the Fresnel lens and the surface S10 of the light valve along the optical axis 102.

TABLE 4

|   | S1 | S2 | S4 | S5 | S6 | S7 | S9 |
|---|---|---|---|---|---|---|---|
| K | −9.5 | 0 | −9.4 | −6.5 | −4.5 | −6.1 | −1 |
| A | −2.4E−06 | −5.5E−06 | −5.0E−06 | −5.1E−06 | 7.99E−06 | 1.09E−05 | 6.47E−07 |
| B | −4.9E−09 | −3.6E−09 | 1.01E−08 | 2.43E−09 | −1.2E−08 | −1.8E−08 | −2.1E−10 |
| C | −4.5E−12 | 5.98E−13 | −2.0E−11 | 1.49E−12 | 7.98E−12 | 1.52E−11 | 3.07E−14 |
| D | 1.92E−14 | 1.19E−15 | 4.05E−14 | 2.05E−15 | −6.6E−16 | −8.4E−15 | −1.5E−19 |
| E | −4.4E−17 | −2.9E−18 | −3.1E−17 | 0 | −4.5E−18 | 2.97E−18 | 0 |
| F | 5.64E−20 | 1.41E−20 | 8.50E−21 | 0 | 3.86E−21 | −1.0E−21 | 0 |
| G | −2.7E−23 | −1.2E−23 | 0 | 0 | −1.2E−24 | 2.77E−25 | 0 |

Detailed optical data, design parameters, aspheric coefficients and diffractive coefficients of the optical lens 100b are shown in Table 3, Table 4 and Table 5 below. Parameters A-G shown in Table 4 are $4^{th}$, $6^{th}$, $8^{th}$, $10^{th}$, $12^{th}$, $14^{th}$ and $16^{th}$ order aspheric coefficients. Parameters C1 and C2 shown in Table 5 are 2th and 4th order coefficients of the diffractive optical surface polynomial. In this embodiment, the second lens L2 has a diffractive optical surface (surface S5), but the invention is not limited thereto.

TABLE 5

|   | S5 |
|---|---|
| Diffraction order | 2 |
| C1 | −3.197 |
| C2 | 1.309E−04 |

Figure 6:
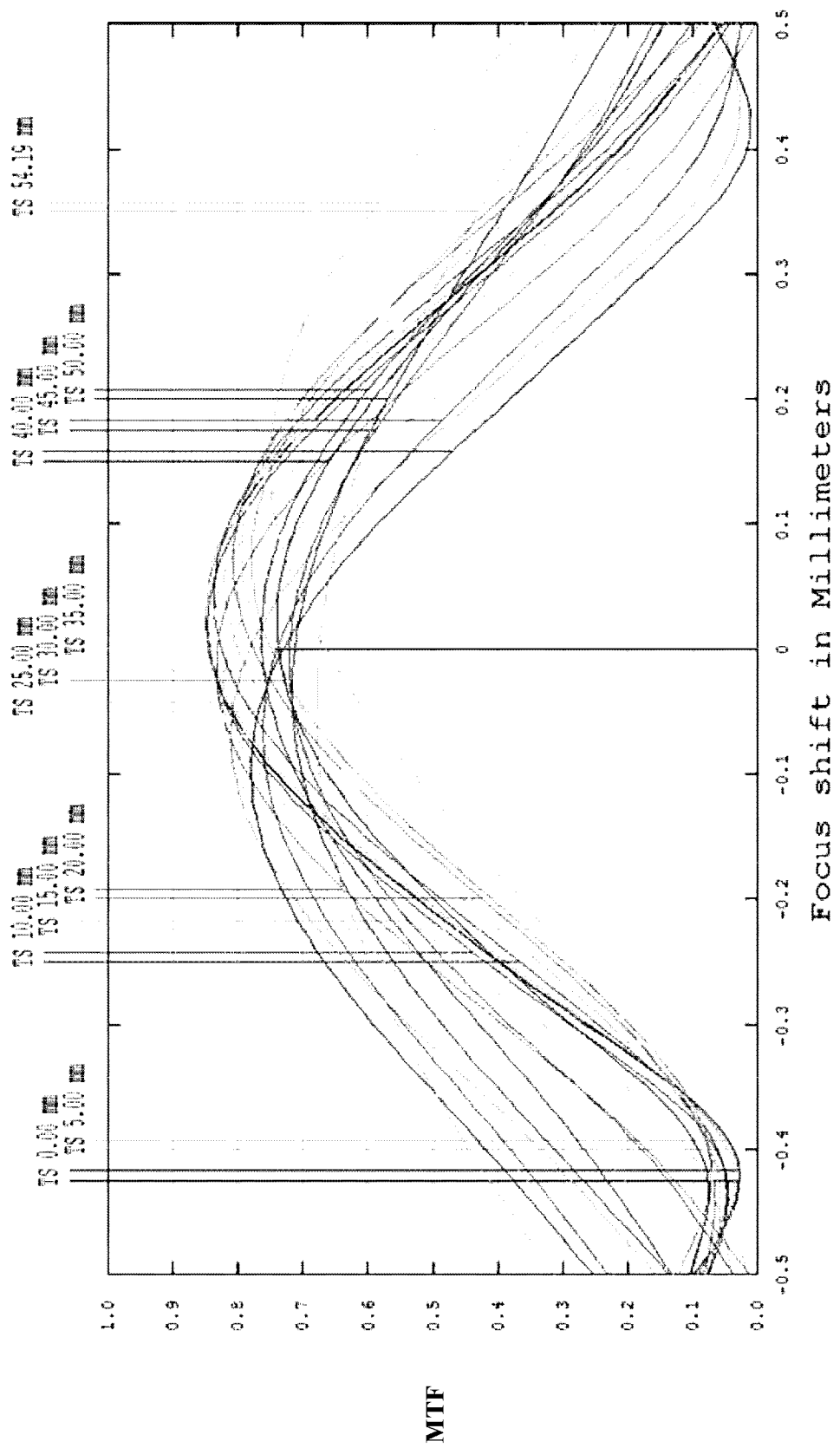
FIGS. 6-8 illustrate optical simulation results of the optical lens shown in FIG. 5, where
Figure 7:
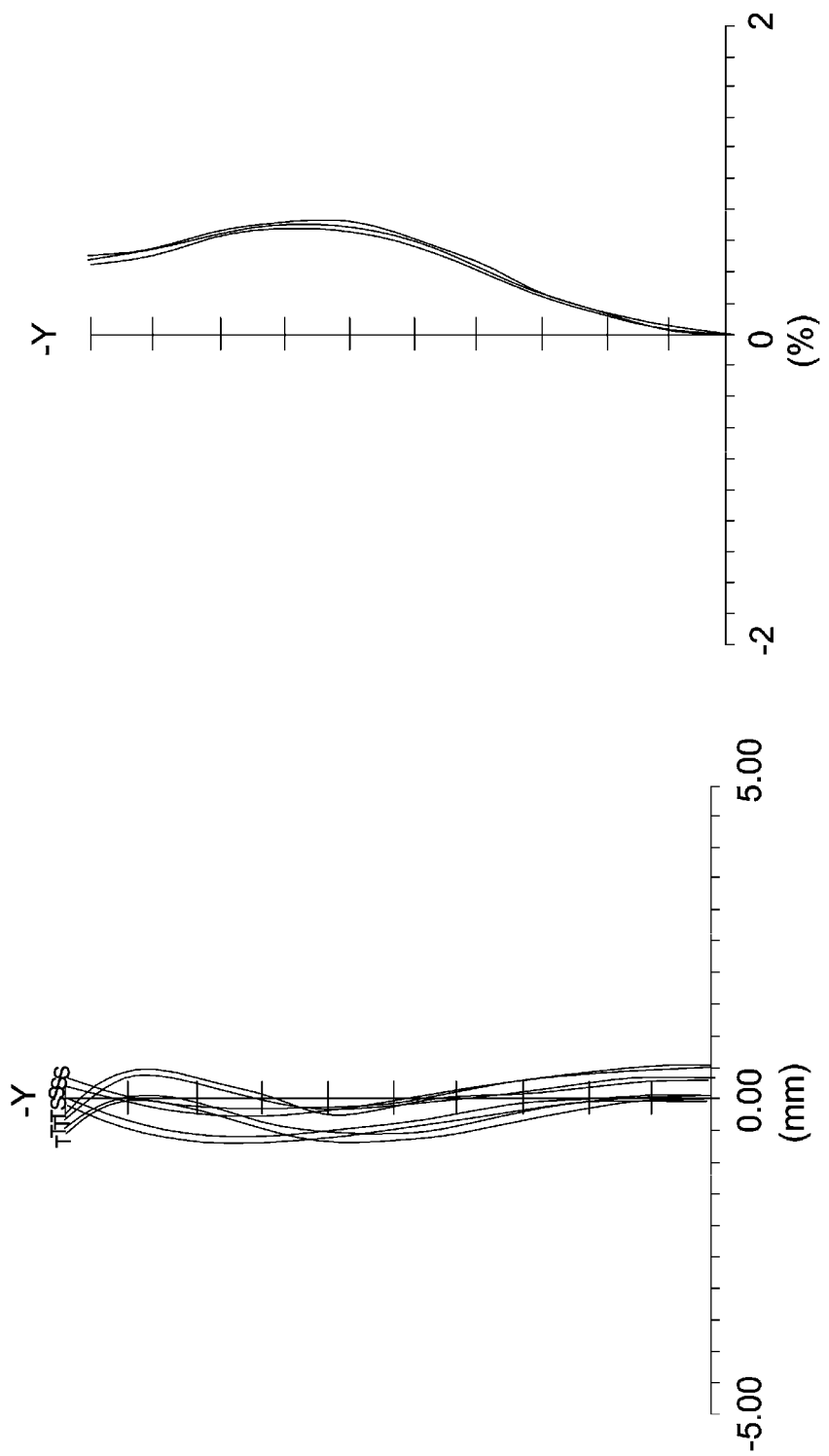
Figure 8:
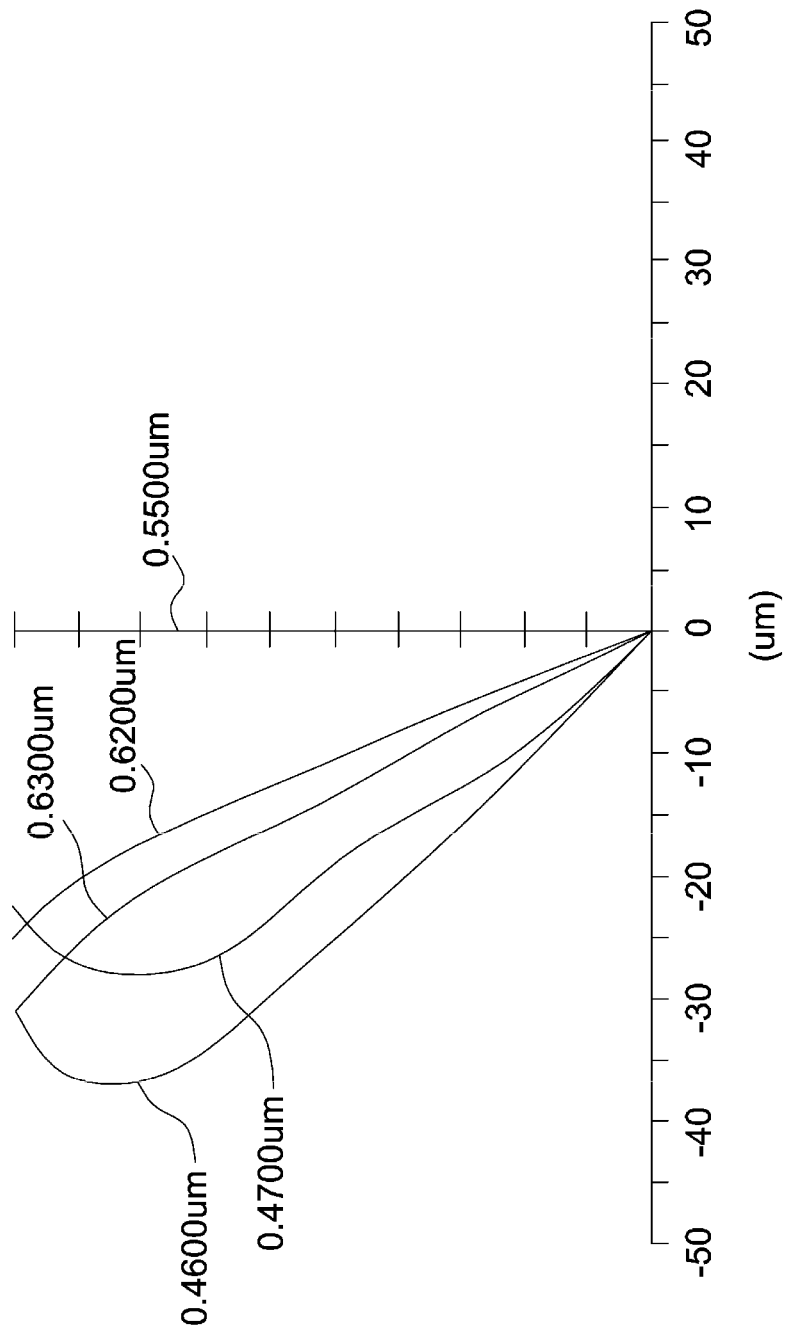

FIGS. 6-8 illustrate optical simulation results of the optical lens 100b, where FIG. 6 is a through focus MTF chart, FIG. 7 illustrates an astigmatic field curve (left side) and a percentage distortion curve (right side), and FIG. 8 illustrates a lateral color graph of the optical lens 100b. The simulated results shown in FIGS. 6-8 are within permitted ranges specified by the standard, which indicates the optical lens 100b may achieve good imaging quality.

Figure 9:
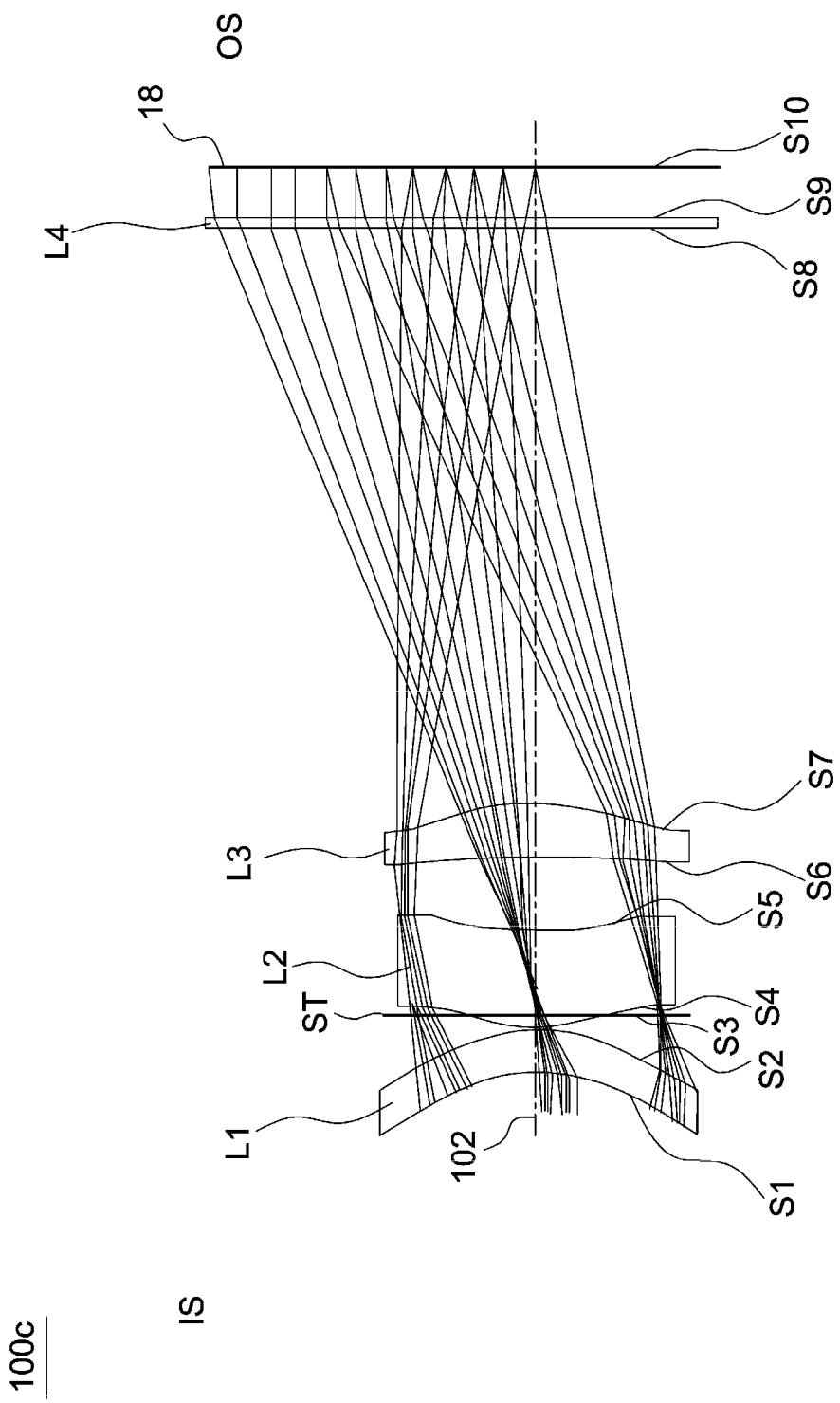
FIG. 9 shows a schematic diagram of an optical lens according to another embodiment of the invention.

FIG. 9 shows a schematic diagram of an optical lens according to another embodiment of the invention. As shown in FIG. 9, an optical lens 100c is disposed between a magnified side IS (such as an image side on the left of FIG. 9) and a minified side (such as an object side on the right of FIG. 9). In this embodiment, the optical lens 100c includes, in order from the magnified side to the minified side, a first lens L1 with a positive refractive power, an aperture stop ST, a second lens L2 with a negative refractive power, a third lens L3 with a positive refractive power, and a Fresnel lens L4 with a refractive power. Further, the minified side is disposed with an LCD panel (light valve) 18. In this embodiment, the first lens L1, the second lens L2 and the third lens L3 are plastic aspheric lens formed by injection molding. The first lens L1, the second lens L2 and the third lens L3 are made of PMMA. In one embodiment, aspheric lenses may be formed by glass molding, but the invention is not limited thereto.

Detailed optical data, design parameters, aspheric coefficients and diffractive coefficients of the optical lens 100c are shown in Table 6, Table 7 and Table 8 below. Parameters A-G shown in Table 7 are $4^{th}$, $6^{th}$, $8^{th}$, $10^{th}$, $12^{th}$, $14^{th}$ and $16^{th}$ order aspheric coefficients. Parameters C1 and C2 shown in Table 8 are 2th and 4th order coefficients of the diffractive optical surface polynomial. In this embodiment, the second lens L2 has a diffractive optical surface (surface S5), but the invention is not limited thereto.

TABLE 6

| Surface | Radius (mm) | Interval (mm) | Refractive index | Abbe number | Object description |
|---|---|---|---|---|---|
| S1 | −23.01 | 7.60 | 1.49 | 57.44 | L1(aspheric lens) |
| S2 | −24.48 | 3.40 | | | |
| S3 | ∞ | −2.34 | | | ST(aperture stop) |
| S4 | 39.33 | 15.44 | 1.49 | 57.44 | L2(aspheric lens) |
| S5 | 35.25 | 12.50 | | | |
| S6 | −205.18 | 9.22 | 1.49 | 57.44 | L3(aspheric lens) |
| S7 | −48.85 | 98.27 | | | |
| S8 | ∞ | 1.8 | 1.49 | 57.44 | L4(Fresnel lens) |
| S9 | −49.20 | 9.00 | | | |
| S10 | | | | | light valve |

An interval of the surface S1 is a distance between the surface S1 and the surface S2 along the optical axis 102, an interval of the surface S2 is a distance between the surface S2 and the surface S3 along the optical axis 102, an interval of the surface S9 is a distance between the surface S9 of the Fresnel lens and the surface S10 of the light valve along the optical axis 102.

TABLE 7

| | S1 | S2 | S4 | S5 | S6 | S7 | S9 |
|---|---|---|---|---|---|---|---|
| K | −5.2 | −3.3 | 0 | 0 | 0 | 0 | −1 |
| A | −1.2E−05 | −6.4E−06 | −2.4E−05 | −3.0E−05 | 6.01E−09 | 1.82E−06 | 1.09E−06 |
| B | 3.16E−08 | 2.09E−08 | 5.44E−08 | 5.32E−08 | 1.64E−09 | 2.88E−09 | −2.2E−10 |
| C | −4.7E−11 | −3.9E−11 | −1.5E−10 | −1.1E−10 | 2.91E−11 | 1.07E−11 | 2.25E−14 |
| D | 3.52E−14 | 4.35E−14 | 2.35E−13 | 1.15E−13 | −6.1E−14 | 2.21E−17 | 0 |
| E | 1.16E−18 | −2.5E−17 | −2.4E−16 | −7.5E−17 | 4.39E−17 | −6.2E−18 | 0 |
| F | −2.3E−20 | −1.1E−22 | 1.13E−19 | 2.98E−20 | −1.9E−20 | −1.3E−20 | 0 |
| G | 1.16E−23 | 4.63E−24 | −1.4E−23 | −4.8E−24 | 9.32E−24 | 1.19E−23 | 0 |

TABLE 8

| | S5 |
|---|---|
| Diffraction order | 2 |
| C1 | −3.452 |
| C2 | 0 |

Figure 10:
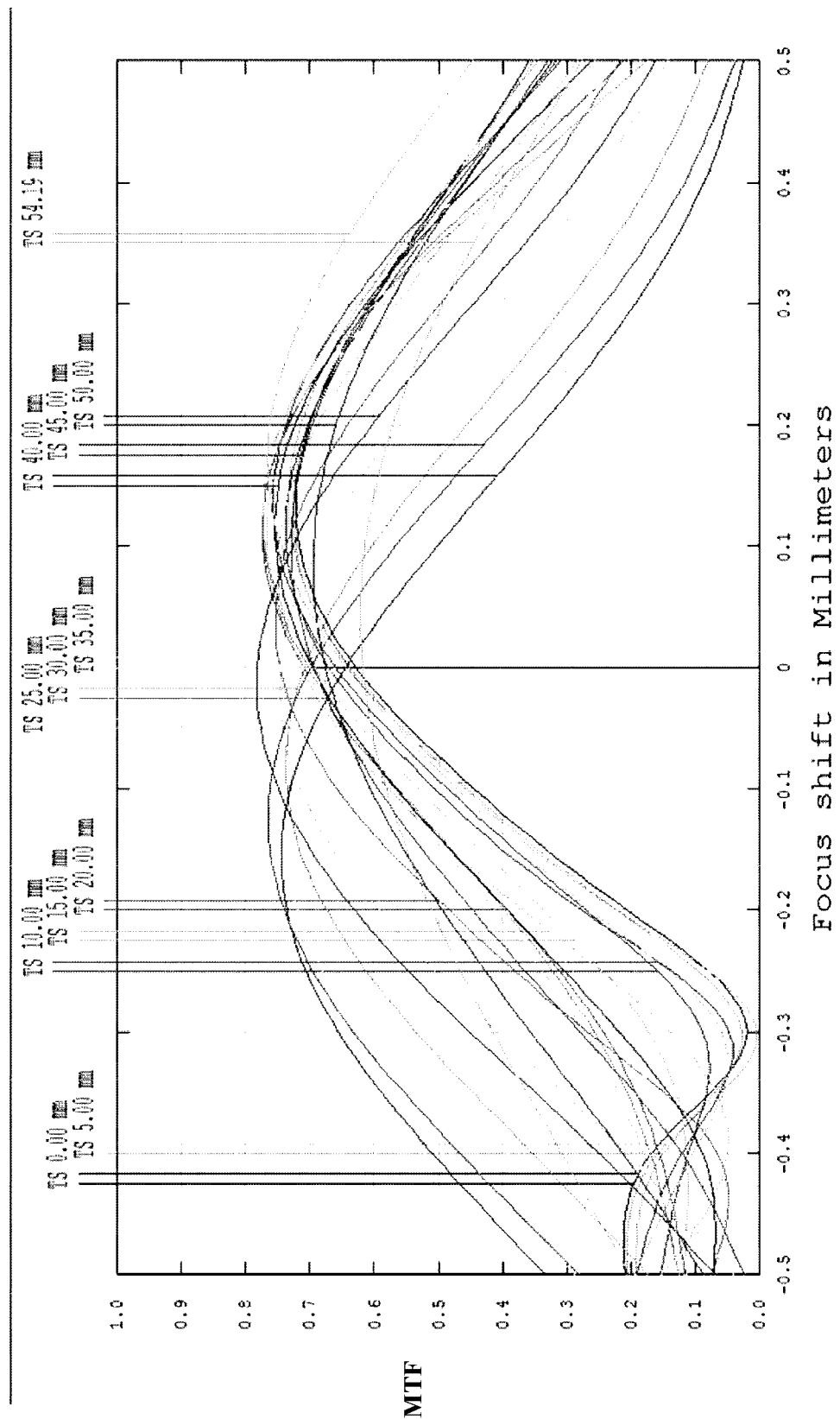
FIGS. 10-12 illustrate optical simulation results of the optical lens shown in FIG. 9, where
Figure 11:
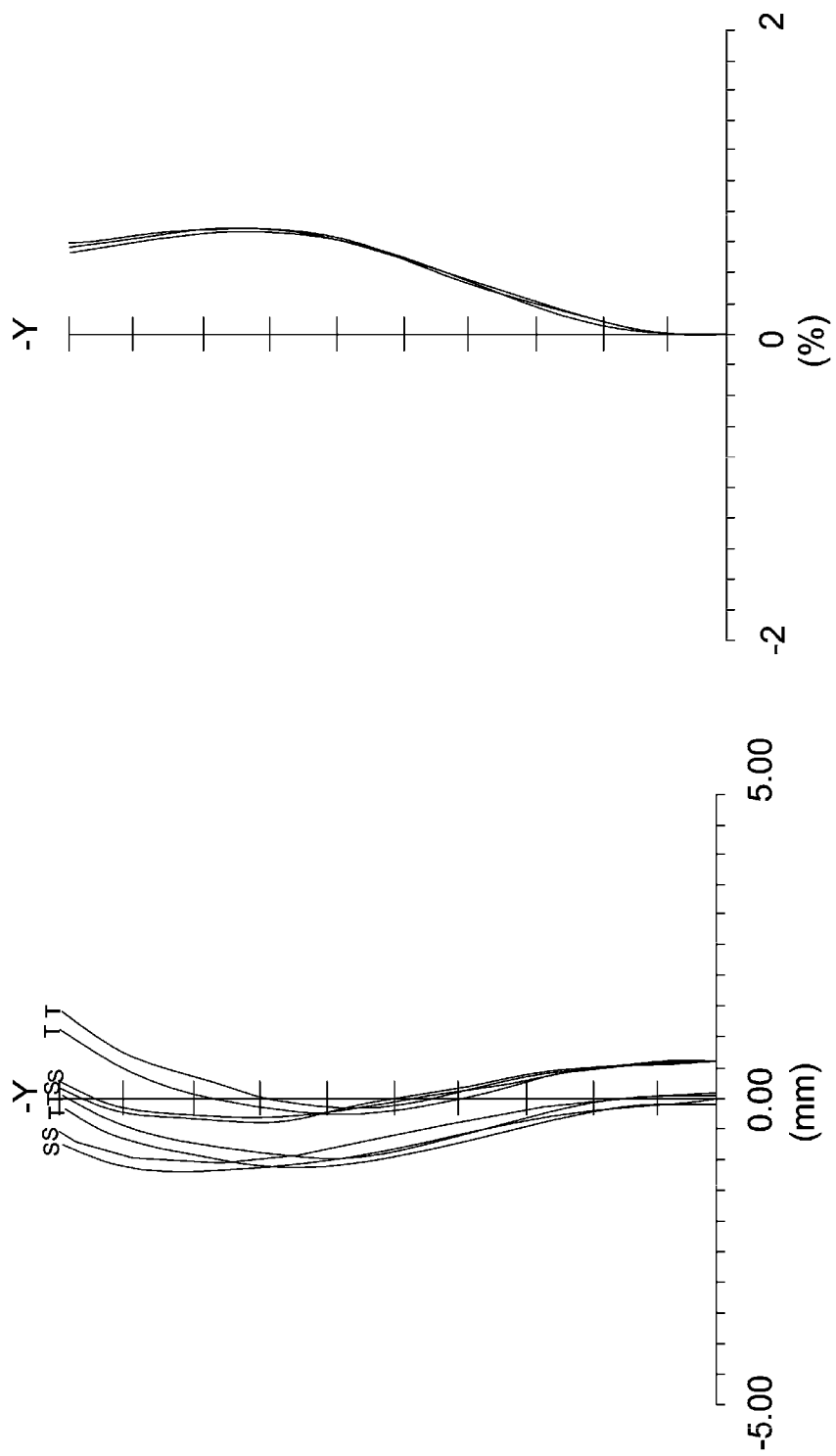
Figure 12:
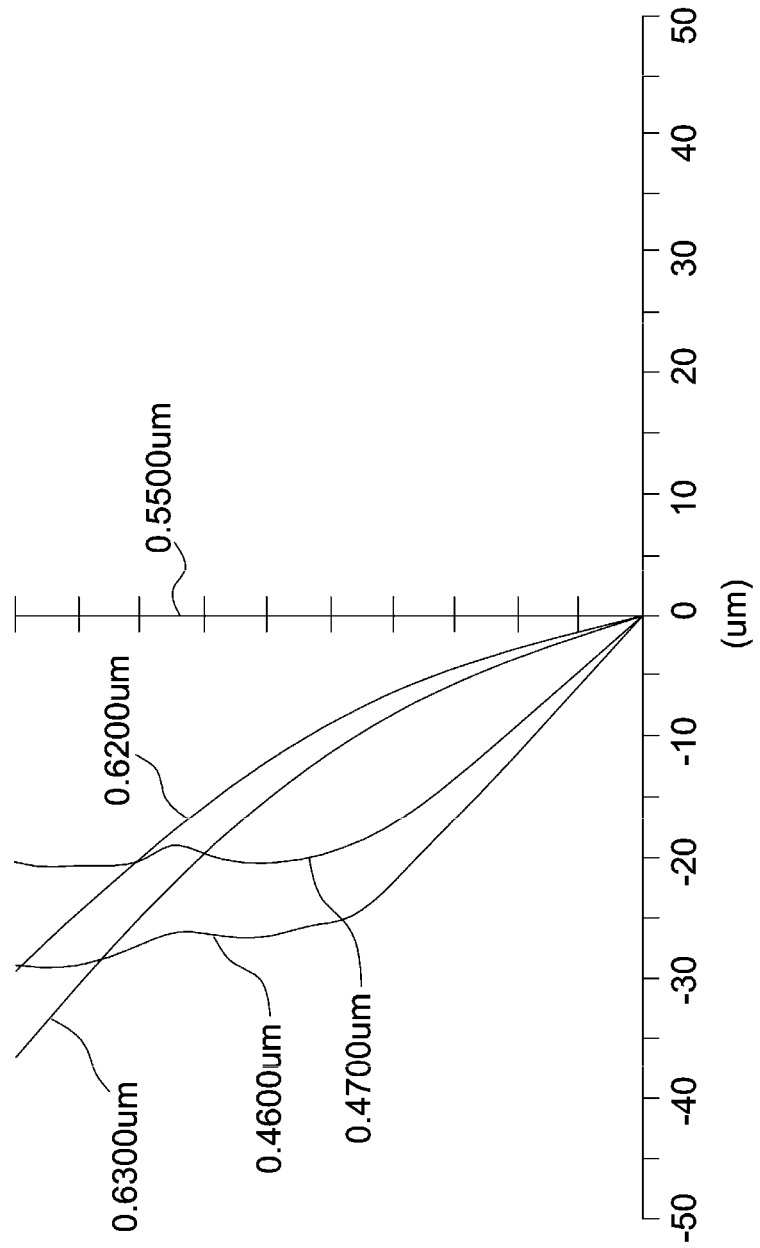

FIGS. 10-12 illustrate optical simulation results of the optical lens 100c, where FIG. 10 is a through focus MTF chart, FIG. 11 illustrates an astigmatic field curve (left side) and a percentage distortion curve (right side), and FIG. 12 illustrates a lateral color graph of the optical lens 100c. The simulated results shown in FIGS. 10-12 are within permitted ranges specified by the standard, which indicates the optical lens 100c may achieve good imaging quality.

Figure 13:
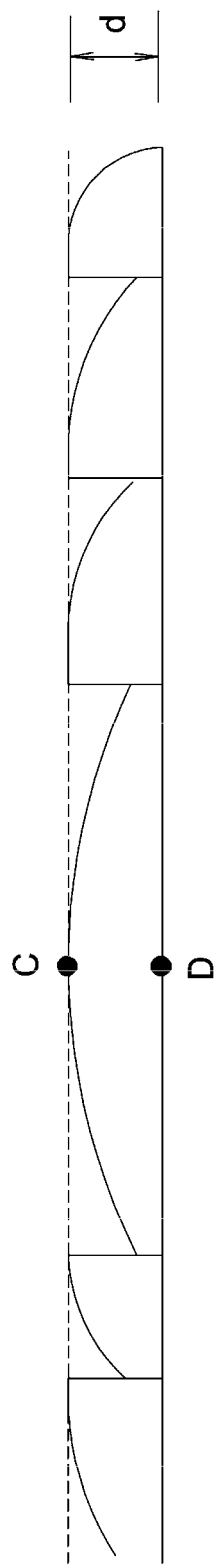
FIG. 13 shows a diffractive optical surface formed by a binary optics according to an embodiment of the invention.

According to the above embodiments, each of the optical lens 100b and the optical lens 100c has an aspheric lens with a diffractive optical surface to correct monochromatic and chromatic aberrations. FIG. 13 shows a diffractive optical surface formed by a binary optics according to an embodiment of the invention. Here, a depth d of a diffractive optical surface is defined as a shortest distance between a point C and a point D, where the point C is arbitrarily picked from a line connecting vertices of the diffractive optical surface and the point D is arbitrarily picked from a bottom line of the diffractive optical surface. In one embodiment, the depth d is in the range of 0.29 um-2.5 um to achieve better diffraction efficiency, but the invention is not limited thereto. In another embodiment, the depth d is in the range of 0.5 um-2.0 um. In still another embodiment, the depth d is in the range of 0.8 um-1.8 um.

In other embodiment of the invention, an optical lens may include a first lens with a positive refractive power, a second lens with a negative refractive power, a third lens with a negative refractive power, a fourth lens with a positive refractive power, and a Fresnel lens with a refractive power. In one embodiment, a distance between an aperture stop and a diffractive optical surface is kept fixed.

The optical lens according to the above embodiments may achieve at least one advantage of lighter weight, lower fabrication costs, good imaging quality and a reduced number of lenses.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. A projection lens, comprising:
a first lens with a positive refractive power, a second lens having a diffractive optical surface and a negative refractive power, and a third lens with a positive refractive power arranged in order from a magnified side to a minified side, a total number of lenses with refractive powers in the projection lens being smaller than six, and the first lens, the second lens and the third lens of the projection lens being aspheric lenses and made of plastic.

2. The projection lens as claimed in claim 1, wherein the projection lens further comprises a lens with a negative refractive power disposed between the first lens and the second lens.

3. The projection lens as claimed in claim 1, wherein a depth of the diffractive optical surface is in the range of 0.29 um-2.5 um.

4. The projection lens as claimed in claim 1, wherein the projection lens further comprises an aperture stop, and a distance between the aperture stop and the diffractive optical surface is kept fixed.

5. The projection lens as claimed in claim 1, wherein the projection lens further includes a Fresnel lens with a refractive power.

6. The projection lens as claimed in claim 1, wherein the first lens and the third lens are made of PMMA, and the second lens is made of EP5000 plastic.

7. The projection lens as claimed in claim 1, wherein the first lens and the third lens are made of PMMA, and the second lens is made of E48R plastic.

8. The projection lens as claimed in claim 1, wherein the first lens, the second lens and the third lens are made of PMMA.

9. A projection apparatus, comprising:
a light source;
a light valve disposed downstream from and in a light path of the light source; and
an optical lens disposed downstream from and in a light path of the light valve, the optical lens comprising a first lens with a positive refractive power, a second lens having a diffractive optical surface and a negative refractive power, and a third lens with a positive refractive power arranged in order from a magnified side to a minified side, a total number of lenses with refractive powers in the optical lens being smaller than six, and the first lens, the second lens and the third lens being aspheric lenses and made of plastic.

10. The projection apparatus as claimed in claim 9, wherein the optical lens further comprises a lens with a negative refractive power disposed between the first lens and the second lens.

11. The projection apparatus as claimed in claim 9, wherein a depth of the diffractive optical surface is in the range of 0.29 um-2.5 um.

12. The projection apparatus as claimed in claim 9, wherein the optical lens further comprises an aperture stop, and a distance between the aperture stop and the diffractive optical surface is kept fixed.

13. The projection apparatus as claimed in claim 9, wherein the optical lens further includes a Fresnel lens with a refractive power.

14. A projection apparatus, comprising:
a light source;
a light valve disposed downstream from and in a light path of the light source; and
an optical lens disposed downstream from and in a light path of the light valve, the optical lens consisting essentially of a first lens, a second lens, and a third lens arranged in order in a direction, the second lens having at least one diffractive optical surface, the first lens, the second lens and the third lens being aspheric lenses and made of plastic, and a total number of lenses with refractive powers in the optical lens being smaller than six, wherein a depth of the at least one diffractive optical surface is in the range of 0.29 um-2.5 um, and the projection apparatus is configured for projecting a real image.

15. The projection apparatus as claimed in claim 14, wherein the optical lens further comprises an aperture stop, and a distance between the aperture stop and the diffractive optical surface is kept fixed.

16. The projection apparatus as claimed in claim 14, wherein the optical lens further includes a Fresnel lens with a refractive power.

* * * * *